Patented Sept. 20, 1932

1,878,672

UNITED STATES PATENT OFFICE

KENNETH W. CARR, OF CHICAGO, ILLINOIS, ASSIGNOR TO DITTO, INCORPORATED, OF CHICAGO, ILLINOIS, A CORPORATION OF WEST VIRGINIA

STENCIL SHEETS

No Drawing.   Application filed April 17, 1929. Serial No. 355,983.

This invention relates to improvements in stencil paper and more particularly to stencil paper comprising a base material of loose open texture, such as for instance, yoshino paper, and a coating, the coating being of such nature that it may be impressed and cut by the type of a typewriting machine or by a stylus or similar instrumentality.

An object of this invention is to provide a stencil sheet which is cheap, durable and efficient and which may be used in its original dry condition, will not crack under ordinary usage, is substantially unaffected by ordinary heat changes, is impervious to ink as encountered in ordinary usage, is strong, and is one, the cut letters of which will last for imprinting a relatively large number of copies.

The principle involved in the formation of stencil paper contemplated in this invention is that of providing a base material such as, for instance, a paper having relative long, loosely associated fibres, preferably yoshino paper, and treating such base material with a coating having as near as possible three characteristic properties, which properties are; first, resistance to deterioration by inks such as will be encountered in ordinary usage, secondly, flexibility such as will maintain the coated paper flexible in character; and, thirdly, capability of being displaced by contacting type or a stylus to produce lines or characters or letters in the manner spoken of in the art as cutting a stencil.

In preparing a coating for the stencil paper, the selection of a main ingredient, which inherently possesses as many of the above stated properties as possible, is desirable. According to the particular properties possessed by the main ingredient various modifying agents may be incorporated therewith so as to produce a final coating material possessing as near as possible, the desirable properties enumerated.

The present invention contemplates the use of synthetic or artificial resin of the type described and claimed in Patent No. 1,590,079, issued to Byck, on June 22d, 1926.

This resin is a reaction product of a methylene containing substance such as formaldehyde, with a product obtained by reacting an excess of phenol with tung oil. The particular characteristic of the resin is that it possesses all of the durable properties of phenol-formaldehyde resins and yet is unusually flexible in character. Another characteristic of this resin is that it is capable of being partially reacted to produce an intermediate product which is soluble in certain well known solvents to produce what is known in the art as a potentially reactive resin in which form it is capable of being rendered insoluble and infusible as a final product upon the application of further heat treatment.

This characteristic behavior of the resin renders it particularly suitable for the production of stencil paper as the resin may be reacted to its intermediate stage and in this form incorporated with certain modifying agents, and a suitable solvent or solvents so as to form a coating composition.

The coating composition so produced may then be applied to a base sheet, such as yoshino paper and the coated sheet subsequently baked. Under the action of the heat treatment of the baking operation, the coating composition is converted from its intermediate stage, to the final insoluble and infusible stage.

The modifying agents which are incorporated with the resin while it is in its intermediate stage, are selected as to kind and proportion to give the desired properties to the resin after it is converted to its final form, the properties desired being those which make for a good, successful stencil paper.

The other substances in addition to the resin used in producing the coating composition are employed for the purpose of bestowing upon the resin the property of being impressionable by the cutting type or stylus after the coating composition is in its final form on the sheet.

In the production of the coating composition, it has been found desirable to provide a shortening agent and a softening or tempering agent. The shortening agent operates to weaken the resin or in other words, to render it less tough, so that it may be more readily cut by the cutting type or stylus whereas the softening agent, such as an oil, or a mixture of or other suitable substance, so that the softening ingredient will lend to the combination of substances, some of the properties of the softening agent or agents.

It has been found that the shortening agent may be either a metallic soap, such as aluminum stearate or a wax, such as for instance, China wax, paraffin wax, or a tallow such as Japan wax, Chinese tallow or a regular animal tallow and also that zinc oxide, barium sulphate, carbon, lithopones and carbonates such as magnesia serve well in this capacity.

Of the above mentioned shortening agents, however, aluminum stearate is found to be very desirable in its effect upon the resin. If in the event some of the insoluble softeners are used and an emulsion is formed, instead of a solution, the result is the same, in either case, as a homogeneous mixture and coating composition is produced.

For the softening or tempering agent, the present invention contemplates the use of peanut oil, either alone or with certain non-volatile derivatives of glycol. Of the glycol derivatives, diethylene glycol monoethyl ether or diethylene glycol monobutyl ether have been found to serve well. As above mentioned, when peanut oil is employed and the proportions are properly selected, the oil may be used without the addition of glycol derivatives but in cases where the glycol derivative is employed, it is found that corn oil may be substituted for peanut oil with good results.

For the solvent or thinner, it is only necessary to have some common solvent for all of the ingredients or to select solvents for the various ingredients which are miscible or capable of forming emulsions so that the final mixed coating will be homogeneous in character. It is preferable to employ as a solvent, a mixture of toluol and ethyl alcohol or in some instances, benzol, either alone or mixed with the toluol and ethyl alcohol, may be employed, but it is to be understood that other suitable solvents may be employed.

Knowing that the resin contemplated in this invention is soluble in its intermediate stage, it is obvious that a solution may be produced from the resin and that various modifying agents of above enumerated types may be incorporated therewith to produce the coating composition.

For the purpose of illustrating this invention, preferred formulas are hereinafter given which are found to produce coating compositions which serve well in the production of stencils after they have been applied to the base sheet and baked in a manner to convert the resin to its final form.

The first formula is as follows:

16 parts of resin varnish, formed by dissolving 45 parts of resin in the solvent
9 parts peanut oil
3½ parts of aluminum stearate The second formula is as follows:
16 parts of resin varnish
10 parts of peanut oil
6 parts of diethylene glycol monoethyl ether
4½ parts aluminum stearate The third formula is as follows:
16 parts of resin varnish
10 parts corn oil (refined)
16 parts of diethylene glycol monoethyl ether
4½ parts aluminum stearate Experiments have shown that in the second and third formulas given above, that diethylene glycol monobutyl ether may be substituted in the same proportions for the diethylene glycol monoethyl ether.

The invention also contemplates the use of other non-volatile derivatives of glycol which may serve well in this use. The invention further contemplates in all of the above formulas, before the mixtures are finally prepared, that a coloring agent be added such as victoria blue base or other suitable coloring material in sufficient quantity to render the coating opaque so that the cut letters of the stencil will reveal the white fibres of the backing sheet by the color contrast.

To prepare stencil paper according to the first formula, it has been found well to first mix 9 parts of peanut oil and 3½ parts of aluminum stearate and add to this, the desired quantity of coloring material which has been previously dissolved in an appropriate amount of solvent, which is preferable 30 parts of any one or any mixture of alcohols, benzols or esters, but which may by way of example be toluol and ethyl or butyl alcohol mixed in proportions of approximately 20 to 25 parts respectively.

This mixture is added at a temperature of about 45 to 50 degrees centigrade and while maintained at this temperature, 16 parts by weight, of the resin varnish containing substantially 45 per cent of the solid resin is then added and the product stirred.

Suitable base sheets such as yoshino paper are then coated in the usual way, with the coating solution prepared as above outlined the sheets being emersed or floated upon the coating bath. When the sheets have been thoroughly covered with the solution, they may be drawn across a straight edge or wire to remove the excess material if this is necessary and then hung up to dry. The drying operation serves to volatilize part of the solvent.

After the drying operation, the sheet is placed in an oven the temperature of which may be from 90 to 150 degrees centigrade but preferably substantially 140 degrees centigrade, and baked for a period of 30 to 60 minutes. After baking, the sheets are removed and cooled at which time the stickiness present during the heat treatment disappears. The product at this time is substantially insoluble by virtue of the reaction produced by the heat treatment involving the constituent parts of the potentially reactive resin.

In preparing stencil sheets, according to the second and third formulas, the process is exactly the same, except that the oil either peanut or corn oil, as the case may be, the glycol derivative and the aluminum stearate are mixed together prior to the introduction of the solvent and coloring agent.

It has been found in practice that a suitable base paper such as yoshino paper, coated and treated in the above indicated manner produces a greatly improved stencil paper. The coating as prepared is quite insoluble in oils and inks and yet is of such character that it may be cut by a stylus or cutting type to form very accurate letters.

It is further found that stencil paper thus prepared when cut, is very durable and will withstand the wear of a large number of reproductions without causing blurs or imperfect letters. Furthermore, paper so produced, is unaffected by weather conditions, remaining in good workable condition at all times and is not subject to being dried out or hardened by exposure to the atmosphere nor is it subject to being cracked in a manner to pass ink when it is folded or creased in ordinary usage.

I claim:

1. A stencil paper comprising a base sheet and a coating composition on said base sheet, including a reaction product of phenol, tung oil and formaldehyde, and peanut oil.

2. A stencil paper comprising a base sheet and a coating composition including a flexible phenol formaldehyde resin and a non-volatile glycol derivative.

3. A stencil paper comprising a base sheet and a coating composition including a flexible phenol-formaldehyde resin, a non-volatile glycol derivative and an oil.

4. A stencil paper comprising a base sheet and a coating composition including a flexible phenol-formaldehyde resin, a non-volatile glycol derivative and peanut oil.

5. A stencil paper comprising a base sheet and a coating composition including a resin, a non-volatile glycol derivative, an oil and aluminum stearate.

6. A coating composition for stencil sheets comprising substantially 16 parts of the reaction product of phenol, tung oil and formaldehyde, 3½ parts of aluminum stearate and 9 parts of peanut oil.

7. A coating composition for stencil sheets comprising 16 parts of the reaction product of phenol, tung oil and formaldehyde, 4½ parts of aluminum stearate, 10 parts of oil, and 6 parts of diethylene glycol.

8. A stencil sheet comprising a base sheet of yoshino paper and a coating composition thereon, said coating composition comprising an artificial resin, aluminum stearate, a non-volatile glycol derivative and an oil.

9. A stencil sheet comprising a base sheet of yoshino paper and a coating composition thereon, comprising a flexible resin, diethylene glycol monoethyl ether, an oil and aluminum stearate.

10. A stencil sheet coating composition comprising 16 parts of a flexible phenol-formaldehyde resin, 9 parts of peanut oil and 3½ parts of aluminum stearate.

Signed at Chicago, Illinois, this 13th day of April, 1929.

KENNETH W. CARR.